United States Patent
Hofmann et al.

(10) Patent No.: US 9,377,029 B2
(45) Date of Patent: Jun. 28, 2016

(54) BLADE OF A TURBOMACHINE

(75) Inventors: Willy Heinz Hofmann, Baden-Ruetihof (CH); Josef Ballmann, Aachen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 457 days.

(21) Appl. No.: 13/530,314

(22) Filed: Jun. 22, 2012

(65) Prior Publication Data

US 2012/0328447 A1    Dec. 27, 2012

(30) Foreign Application Priority Data

Jun. 24, 2011    (EP) ..................................... 11171299

(51) Int. Cl.
  *F04D 29/32* (2006.01)
  *F01D 5/20* (2006.01)
  *F01D 5/14* (2006.01)
  *F04D 29/68* (2006.01)

(52) U.S. Cl.
  CPC .............. *F04D 29/324* (2013.01); *F01D 5/145* (2013.01); *F01D 5/20* (2013.01); *F04D 29/681* (2013.01); *F05D 2240/301* (2013.01); *F05D 2240/307* (2013.01); *F05D 2250/61* (2013.01); *F05D 2250/611* (2013.01); *Y02T 50/671* (2013.01); *Y02T 50/673* (2013.01); *Y10T 29/49316* (2015.01)

(58) Field of Classification Search
  CPC ........... F01D 5/145; F01D 5/142; F01D 5/20; F04D 29/324; F05D 2250/61; F05D 2250/611
  USPC ......... 415/170.1, 173.1, 173.5; 416/228, 235, 416/236 R
  See application file for complete search history.

(56) References Cited

U.S. PATENT DOCUMENTS

| | | | | |
|---|---|---|---|---|
| 1,317,707 | A | * | 10/1919 | Johnson ........................ 416/228 |
| 6,027,306 | A | * | 2/2000 | Bunker ...................... 415/173.5 |
| 6,568,909 | B2 | * | 5/2003 | Szucs et al. .................... 416/228 |
| 7,351,039 | B2 | * | 4/2008 | Bachofner et al. ............ 416/228 |
| 2003/0059309 | A1 | | 3/2003 | Szucs et al. |
| 2005/0106030 | A1 | | 5/2005 | Bachofner et al. |
| 2007/0098562 | A1 | * | 5/2007 | Tudor ........................ 416/236 R |

FOREIGN PATENT DOCUMENTS

| | | |
|---|---|---|
| CH | 316898 A | 10/1956 |
| EP | 1529962 A2 | 5/2005 |

(Continued)

OTHER PUBLICATIONS

European Patent Office, Extended European Search Report in European Patent Application No. 11 17 1299.0 (Nov. 18, 2011).

*Primary Examiner* — Richard Edgar
*Assistant Examiner* — Eldon Brockman
(74) *Attorney, Agent, or Firm* — Buchanan Ingersoll & Rooney PC

(57) ABSTRACT

A blade of a turbomachine or a flying machine includes a blade airfoil extending in a radial direction from a blade root to a blade tip. The blade airfoil has an inflow-side leading edge, an outflow-side trailing edge, a pressure side and a suction side. A surface of each of the pressure side and the suction side extends between the inflow-side leading edge and the outflow-side trailing edge. The blade tip has an end face with a camber line that extends from the inflow-side leading edge to the outflow-side trailing edge. At least one tip-side recess forms a depression from the end face into the blade airfoil, the depression extending continuously from the pressure side to the suction side and having a partial length of the camber line.

16 Claims, 2 Drawing Sheets

(56) References Cited

FOREIGN PATENT DOCUMENTS

| EP | 2202385 | A1 | 6/2010 |
| EP | 2267275 | A2 | 12/2010 |
| FR | 2935348 | A1 | 3/2010 |
| GB | 2153918 | A | 8/1985 |
| GB | 2427901 | A | 1/2007 |
| WO | WO 2008082397 | A1 | 7/2008 |

* cited by examiner

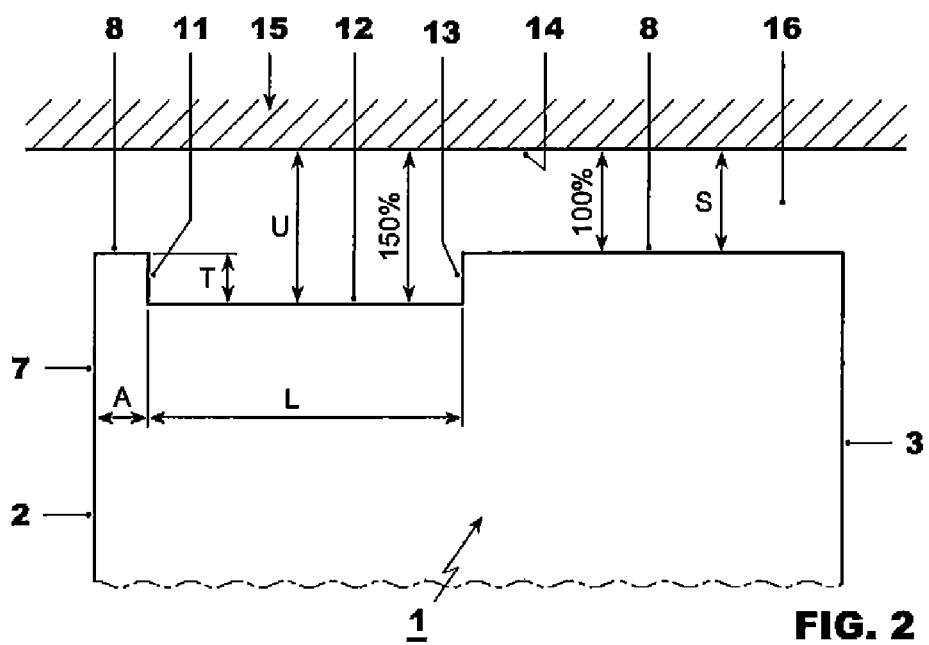

BLADE OF A TURBOMACHINE

CROSS-REFERENCE TO PRIOR APPLICATION

Priority is claimed to European Patent Application No. EP 11171299.8, filed on Jun. 24, 2011, the entire disclosure of which is hereby incorporated by reference herein.

FIELD

The present invention relates to a blade of a turbomachine. The invention also relates to the use of such a blade.

BACKGROUND

Blade airfoils, which are designed both as rotor blades and as stator blades and are used in turbomachines, are known from the prior art.

A gas turbine with a compressor, the rotor of which has a number of compressor stages arranged in the flow direction and comprising a number of compressor blades in the circumferential direction, may be referred to here by way of example.

The rotor blades do not have shrouds. Such shrouds are more likely to be found in the case of stator blades.

Concentrated vortices, which develop by rolling up in three-dimensional flow fields with a main flow direction on the separation edges and downstream extend in a region of higher pressure, are created in such a turbomachine. Such concentrated vortices, by interaction with the pressure field, create larger regions with disordered flow, which significantly impairs the output of the turbomachine. Moreover, the mass throughput of the flow medium is significantly reduced, which further reduces the output.

SUMMARY

In an embodiment, the present invention provides a blade of a turbomachine or a flying machine. The blade includes a blade airfoil extending in a radial direction from a blade root to a blade tip. The blade airfoil has an inflow-side leading edge, an outflow-side trailing edge, a pressure side and a suction side. A surface of each of the pressure side and the suction side extends between the inflow-side leading edge and the outflow-side trailing edge. The blade tip has an end face with a camber line that extends from the inflow-side leading edge to the outflow-side trailing edge. At least one tip-side recess forms a depression from the end face into the blade airfoil, the depression extending continuously from the pressure side to the suction side and having a partial length of the camber line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings. Like elements are provided with the same designations in the different figures. In the figures:

FIG. 2 shows a schematic side view of the blade airfoil according to FIGS. 1A and 1B.

DETAILED DESCRIPTION

Figure 1B:
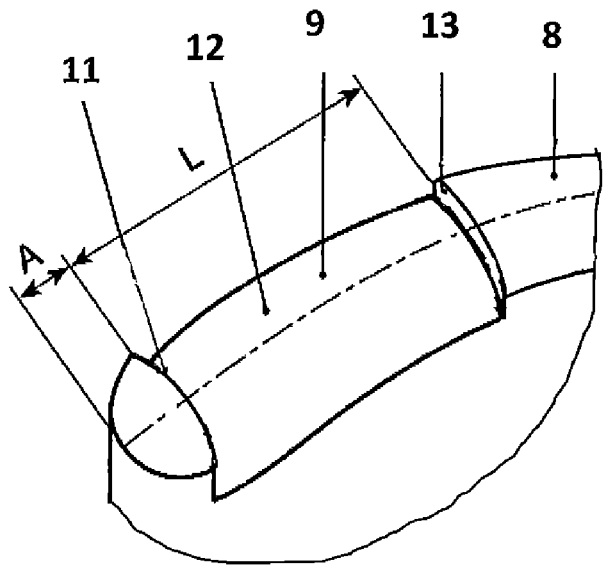
FIGS. 1A and 1B show schematic perspective views of an embodiment of a blade airfoil according to the present invention.

In an embodiment, the invention provides a remedy to eliminate the aforesaid disadvantages. By suitable measures, in an embodiment, the invention minimizes the extent of the disordered flow and maximize the output of the turbomachine.

In an embodiment, the invention provides a blade which can be used as and encompasses both a stator blade and a rotor blade. Thus, in an embodiment, the invention can be implemented in the case of both types of blade.

The features according to an embodiment of the invention are initially described based on a rotor blade, but such description is also applicable to a stator blade.

Therefore, a rotating blade airfoil, i.e. the rotor blade for a turbomachine, comprises a leading edge, a trailing edge and also a pressure-side sidewall and a suction-side sidewall. The sidewalls extend between the leading edge and the trailing edge of the blade airfoil and connect this, wherein the sidewalls, which are exposed to throughflow, usually extend from the blade root in question to the blade tip. The blade tip in the case of a rotor blade usually has an end face at the end. If, when necessary, the rotor blade is provided with a shroud, then this shroud then forms the end face of the blade airfoil for the further consideration of the features according to an embodiment of the invention.

A so-called profile chord extends from the leading edge, which is exposed to the inflow, to the trailing edge of the blade airfoil. This blade airfoil now comprises at least one end-face recess which in the radial direction of the blade airfoil forms a depression towards the axis of the rotor, this recess extending from the pressure-side sidewall right through to the suction-side sidewall, that is to say extends continuously over the entire thickness of the blade airfoil in such a way that this recess forms a depression between the pressure-side sidewall and the suction-side sidewall at the location in question.

In this case, this recess is formed so that it accommodates the flow separation line so that the region of disordered flow is minimized, as a result of which flow losses can also be minimized.

Such a blade airfoil is provided at least with one such recess, wherein such a recess forms a widening of the gap between the inner surface of the stator and the end-face termination of the blade airfoil in the radial direction.

The recess, in relation to the length of the profile chord—also known as camber line—of the blade airfoil, preferably has a length of more than 20% of the length of the profile chord. The recess especially has a length in the range of between 20% and 60% of the length of the profile chord, preferably a length in the range of between 30% and 55% of the length of the profile chord, especially preferably a length in the range of between 49% and 52% of the length of the profile chord.

The start of the recess in the flow direction is at a distance from the leading edge of the blade airfoil, this distance preferably corresponding to between 0.5% and 1.5% of the length of the profile chord of the blade airfoil.

A further critical positioning of the start of the recess in relation to the leading edge of the blade can be defined as follows:

In the case of transonic profiles, the vortex invariably starts directly after the leading edge, which forms the inflow edge of the blade, so that the start of the recess can be kept flexible per se in relation to the leading edge.

In the case of subsonic profiles, however, the vortex development according to internal findings begins at about 10-15% of the profile chord length—which has also been known as camber line—downstream of the leading edge, wherein the said interval and the two benchmark values may undergo modifications, depending upon flow conditions. If the effects which result from the recess are now to bear influence, then the recess must first begin at 15 to 50%, preferably 15 to 30%, of the length of the camber line downstream of the leading edge 2 of the blade.

The recess, therefore, as explained already, preferably constitutes a continuous radial depression on the end face of the blade airfoil.

From this perspective, an intermediate gap widening is formed between the inner face of the stator and the end face of the blade airfoil, that is to say of the rotor blade, in the region of the recess, which introduces the described advantages.

The recess preferably has a depth which corresponds to 30-70% of the distance from the flow-side surface of the stator to the tip-side end of the blade airfoil, especially 50% thereof.

Advantageous embodiments according to the object are characterized in the dependent claims.

Ways of implementing the invention, industrial applicability

Figure 1A:
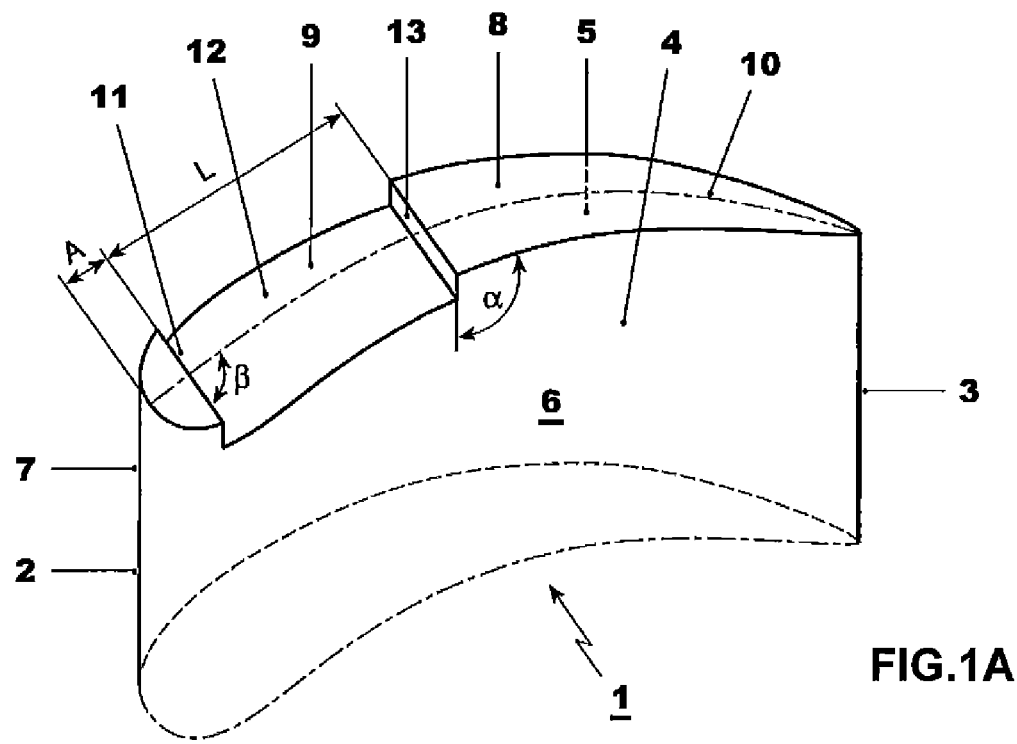

Shown in FIGS. 1A and 1B are schematic perspective views of an embodiment of a tip section of a blade airfoil 1.

The blade airfoil 1, which in this case is represented as a rotor blade, comprises a leading edge or inflow edge 2, a trailing edge or outflow edge 3, a pressure-side sidewall 4 and a suction-side sidewall 5. The suction-side sidewall 5 and the pressure-side sidewall 4 extend between the leading edge 2 and the trailing edge 3 and therefore form the blade airfoil body. The sidewalls 4, 5 can be in a variety of designs, depending upon the field of application. In the present embodiment, the one sidewall 4 is of a concave design, whereas the other sidewall 5 is of a convex design.

The leading edge 2 and the trailing edge 3 extend from a root section 6, which is only partially shown in FIG. 1A to a tip section 7. Via the root section 6, the blade airfoil 1 is anchored, for example, by a rotor shaft. The tip section 7, which in this case has an end face 8, then adjoins the root section 6 in the radial direction. The tip section 7 does not have a shroud in this case. The end face 8 forms the termination of the blade airfoil 1 in the radial direction.

The end face 8 is delimited by the cut edges which are created therefrom and the sidewalls 4, 5 and preferably forms a planar surface. Alternatively, the end face 8, depending upon application, can also be of a design which is concave, convex, or concave and convex in sections, that is to say undulated.

Also, a profile chord 10 of the blade airfoil extends from the leading edge 2 right through to the trailing edge 3. This profile chord 10 basically fulfills the function of a geometric definition line. The length of the profile chord 10 is defined by the corresponding distance from the leading edge 2 right through to the trailing edge 3. The profile chord 10 can be defined as the central middle line which follows the curvature of the two sidewalls.

The blade airfoil 1 furthermore comprises a recess 9, formed as a depression, which extends from the pressure-side sidewall 4 to the suction-side sidewall 5. This recess therefore forms a channel which connects the suction side and the pressure side. Consequently, the recess 9 forms a cutout from the pressure-side sidewall 4 to the suction-side sidewall 5. This recess 9, in other words, can be referred to as a groove or slot, especially as a rectangular slot.

As explained already in the introduction, concentrated vortices, which develop in three-dimensional fields by rolling up with a main flow direction on separation edges, are formed on said separation edges. Downstream, these vortices extend in a region of higher pressure. These concentrated vortices, as a result of interaction with the pressure field, can create larger regions with disordered flow and considerably reduce the desired mass throughput of the flow medium, which results in an output reduction of the turbomachine. The extent of the disordered flow can be reduced by the vortex being already interrupted in its development. The recess 9 accommodates the flow separation line, as seen in the flow direction, just after the beginning of the separation and therefore weakens the interaction with the pressure field, makes the region of disordered flow smaller, and so reduces flow losses.

In particular, in the case of a compressor of a turbomachine, the efficiency is especially advantageously increased. The technical theory can be applied both in the transonic range and in the subsonic range.

The recess 9 shown in FIGS. 1A and 1B is delimited by a front wall 11, a base surface 12 and a rear wall 13.

The front wall 11 and the rear wall 13 in this case extend basically perpendicularly to the end face 8 and in this case are formed as flat or planar surfaces. Consequently, the angle between the end face 8 and the extent of the walls 11 or 13 according to FIGS. 1A and 1B is 90°. Other angular extents are also possible, however, i.e. the front wall 11 and/or the rear wall 13 can have an acute or obtuse angle in each case in relation to the end face 8.

Such an inclination can also be designed so that the clear width of the recess 9 perpendicular to the profile chord 10 decreases with increasing depth of the recess 9. The angle $\alpha$ is then greater than 90°, preferably in the range of between 90° and 135°, in the case of this embodiment.

With regard to the alignment of the front wall 11 and the rear wall 13, it may be noted here that the front wall 11 and/or the rear wall 13 extend basically perpendicularly to the profile chord 10 with regard to the direction of said profile chord 10. The angle $\beta$ in FIG. 1A, which defines the angle between the corresponding section of the profile chord 10 and the wall 11, 13, is therefore preferably an angle of 90°.

The variability of the angles $\alpha$ and $\beta$ in relation to the recess 9 can be interdependent in relation to the aforesaid angle sizes.

Alternatively, the front wall 11 and/or the rear wall 13 can also be of a concave or convex design, the corresponding concavity or convexity extending around an axis which runs parallel to the surface of the respective wall 11, 13 and through the profile chord 10.

Alternatively, it is conceivable to provide the front wall 11 and/or the rear wall 13 with a crowned shape compared to the surface of the recess 9.

The base surface 12 of the recess 9 preferably extends parallel to the end face 8. The depth of the recess 9, which corresponds to the distance between the end face 8 and the base surface 12, as seen in the vertical direction from the base surface 8, is basically constant over the entire base surface 12 of the recess 9 in the case of the parallel design.

Alternatively, the base surface 12 can also extend in a direction which is inclined to the end face 8, wherein the inclination can be designed so that the depth of the recess 9 between the end face 8 and the base surface 12, as seen in the vertical direction from the end face 8, decreases with increasing distance from the leading edge 2. Consequently, the depth of the recess decreases with increasing distance from the leading edge 2.

With regard to the rear wall 13, it may be noted here that in the case of a base surface 12 formed with an inclination this rear wall could even be omitted if the base surface 12 merges directly into the end face 8 simply as a result of this inclination.

The recess 9 is arranged at a distance A, as seen from the leading edge 2. The distance A preferably corresponds basically to a length in the range of between 0.5% and 1.5% of the length of the profile chord 10 of the blade airfoil 1. Depending upon the intended application, other ranges are also conceivable in this case.

A further critical positioning of the start of the recess 9 in relation to the leading edge 2 of the blade can be defined as follows:

In the case of transonic profiles, the vortex invariably starts directly after the leading edge 2, which forms the inflow edge of the blade, so that the start of the recess 9 can be kept flexible in itself in relation to the leading edge 2.

In the case of subsonic profiles, however, the vortex development begins according to internal findings at a distance A of about 10-15% of the camber line (profile chord length) downstream of the leading edge 2, wherein the said interval and the two benchmark values may undergo modifications in both directions depending upon flow conditions. If the positive effects which are associated with the recess 9 are now to bear influence in the case of subsonic profiles, then the recess must first begin at a distance A of 15 to 50%, preferably 15 to 30%, of the length of the camber line downstream of the leading edge 2 of the blade.

The recess 9 extends along a length L in the direction of the profile chord 10. The length L especially preferably has a dimension which corresponds to the range of between 49% and 52% of the length of the profile chord 10 of the blade airfoil. Other ranges are also conceivable in this case, depending upon the intended application—for example a length L of more than 20% of the length of the profile chord 10, especially a length L in the range of between 20% and 60% of the length of the profile chord 10, preferably a length L in the range of between 30% and 55% of the length of the profile chord 10.

In FIG. 2, a schematic view of a blade airfoil in a turbomachine 15 is shown from the side.

A turbomachine 15 typically comprises an inner wall 14, relatively to which the blade moves around a rotational axis which in this case would run parallel to the inner wall 14.

In order to bring about the above-described effect of reducing the disordered flow, it has proved to be especially advantageous if the depth of the recess 9 is selected in a defined relationship with the gap 16 between the inner wall 14 and the end face 8. The gap 16 has a distance S between the end face 8 and the inner wall 14. The distance S is defined as the clear width between the end face 8 and the inner wall 14, as seen perpendicularly to the rotational axis of the blade airfoil 1. The distance U defines the clear width between the base surface 12 of the recess 9 and the inner wall 14 and consists basically of the depth T of the recess and the distance S.

In the case of the recess 9, it is virtually a widening of the gap between the inner wall 14 of the casing of the turbomachine 15 and the end face 8 of the blade airfoil. The inner wall 14 typically has a hollow-cylindrical surface and the gap is defined in this case between this surface and the end face 8 or the recess 9. This gap widening is then provided in the region of the recess 9.

The distance U is preferably selected to be greater than the distance S by a factor in the range of between 1.3 and 1.7, especially preferably by a factor of 1.5. Consequently, the distance U corresponds to between 130 and 170%, especially 150%, of the distance S. With regard to the depth, this means that this is smaller than the distance S by a factor of 0.3 to 0.7, especially by a factor of 0.5.

The present technical theory, however, can be applied not only in the field of turbomachines, for example in the field of stationary turbomachines. It is also possible to use the design of the blade according to the invention on a rotor of a helicopter or on a propeller of an aircraft, wherein in all cases the impulse sound can be reduced as a result. A vortex, which is encountered by a following adjacent rotor, is generated at the tip of a rotor of a flying machine. This interaction basically creates noise which can be greatly reduced by the arrangement of a corresponding recess.

In another embodiment, a plurality of recesses 9 are arranged in series with regard to the direction of the profile chord 10. All other above-described features could then virtually be applied to each recess. In this embodiment, each recess has a partial length, wherein the sum of all the partial lengths would correspond to the length L defined above.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF DESIGNATIONS

1 Blade airfoil
2 Leading edge, inflow edge
3 Trailing edge, outflow edge
4 Pressure-side sidewall
5 Suction-side sidewall
6 Root section
7 Tip section
8 End face
9 Recess
10 Profile chord, camber line
11 Front sidewall
12 Base surface
13 Rear sidewall
14 Inner wall of the casing of the turbomachine
15 Turbomachine
16 Gap
A Distance
L Length of the recess
S Clear width of the gap
T Depth of the recess
U Clear width of the gap plus depth of the recess

What is claimed is:

1. A blade of a turbomachine comprising:
   a blade airfoil extending in a radial direction from a blade root to a blade tip and having an inflow-side leading edge, an outflow-side trailing edge, a pressure side and a suction side, a surface of each of the pressure side and the suction side extending between the inflow-side leading edge and the outflow-side trailing edge, the blade tip having an end face with a camber line that extends from the inflow-side leading edge to the outflow-side trailing edge, wherein at least one tip-side recess forms a depression from the end face into the blade airfoil, the depression extending continuously from the pressure side to the suction side and having a partial length of the camber line;
   wherein the at least one tip-side recess has a depth T which corresponds to a distance from the end face to a base surface of the at least one tip-side recess, the depth being between 30% and 70% of a distance S from the end face to an inner wall of the turbomachine;

wherein the at least one tip-side recess is disposed at a distance A from the leading edge that is between 0.5% and 1.5% of a total length of the camber line; and wherein the length of the at least one tip-side recess is between 30% and 55% of the total length of the camber line.

2. The blade according to claim 1, wherein the at least one tip-side recess forms an enlargement of a gap between an inner wall of the turbomachine and the end face of the blade airfoil.

3. The blade according to claim 1, wherein the length of the at least one tip-side recess is between 49% and 52% of the total length of the camber line.

4. The blade according to claim 1, wherein the at least one tip-side recess forms a cutout through the blade from a sidewall of the pressure side to a sidewall of the suction side.

5. The blade according to claim 1, wherein the at least one tip-side recess is disposed in an offset manner from the inflow-side leading edge in a direction toward the outflow-side trailing edge so that, in a region of the inflow-side leading edge, a contour of the blade remains basically unaltered.

6. The blade according to claim 5, wherein at least one of the front wall and the rear wall extend basically perpendicularly or in an inclined manner with respect to the end face.

7. The blade according to claim 5, wherein at least one of the front wall and the rear wall include a flat or concave or convex surface.

8. The blade according to claim 5, wherein at least one of the front wall and the rear wall extend basically perpendicularly to a direction of the camber line in a region of a point of intersection between the camber line and the at least one of the front wall and the rear wall.

9. The blade according to claim 5, wherein at least one of the front wall and the rear wall extends perpendicularly with respect to the end face.

10. The blade according to claim 5, wherein the front wall and the rear wall extend perpendicularly with respect to the end face.

11. The blade according to claim 5, wherein at least one of the front wall and the rear wall extends in an inclined manner with respect to the end face.

12. The blade according to claim 5, wherein the front wall and the rear wall extend in an inclined manner with respect to the end face.

13. The blade according to claim 1, wherein the at least one tip-side recess is delimited by a front wall, a base surface and a rear wall.

14. The blade according to claim 1, wherein a base surface of the at least one tip-side recess extends parallel to the end face.

15. The blade according to claim 1, wherein a base surface of the at least one tip-side recess is inclined to the end face such that a distance between the end face and the base surface decreases with an increasing distance from the inflow-side leading edge.

16. The blade according to claim 1, wherein the depth T is 50% of the distance S from the end face to the inner wall of the turbomachine.

* * * * *